United States Patent [19]

Cassagne et al.

[11] Patent Number: 4,850,334
[45] Date of Patent: Jul. 25, 1989

[54] INNER CERAMIC TUBE IN PARTICULAR FOR A GLOVE FINGER-SHAPED RADIANT TUBE FOR RECIRCULATION

[75] Inventors: Jean-Pierre Cassagne, Fontenay sous Bois; Laurent Scrive, Paris, both of France

[73] Assignee: Gas De France, Paris, France

[21] Appl. No.: 205,180

[22] Filed: Jun. 10, 1988

[30] Foreign Application Priority Data

Jun. 11, 1987 [FR] France ................. 87 08146

[51] Int. Cl.[4] ............................................. F23D 14/12
[52] U.S. Cl. .................................. 126/91 R; 165/142; 432/209; 431/353
[58] Field of Search ...................... 126/91 A, 91 R; 431/353, 326, 328; 165/142; 432/147, 209

[56] References Cited

U.S. PATENT DOCUMENTS

| | | | |
|---|---|---|---|
| 2,105,533 | 1/1938 | Hess | 431/353 |
| 2,478,732 | 8/1949 | Wilson et al. | 126/91 A |
| 4,269,266 | 5/1981 | Coates, Jr. et al. | 165/142 |

FOREIGN PATENT DOCUMENTS

| | | |
|---|---|---|
| 0441140 | 4/1941 | Belgium . |
| 0191910 | 8/1986 | European Pat. Off. . |
| 1551762 | 3/1972 | Fed. Rep. of Germany . |
| 2314118 | 7/1974 | Fed. Rep. of Germany . |
| 2706981 | 8/1978 | Fed. Rep. of Germany . |
| 2940245 | 4/1981 | Fed. Rep. of Germany . |
| 3105406 | 9/1982 | Fed. Rep. of Germany . |

Primary Examiner—Ira S. Lazarus
Assistant Examiner—Christoper Hayes
Attorney, Agent, or Firm—Kenyon & Kenyon

[57] ABSTRACT

An inner tube for a radiant tube for recirculating burnt gases supplied by a burner, consisting of a plurality of axially aligned assembled tube sections arranged end to end whereas the assembling means consist each one of a sleeve coaxially surrounding the ends of said sections to be interconnected and the radially inner surface of which comprises in the middle of its length an annular collar projecting radially inwards and fitting between both tube sections to be connected together, the inner surface portions which are located on either side of the collar widening gradually towards the sleeve ends.

6 Claims, 1 Drawing Sheet

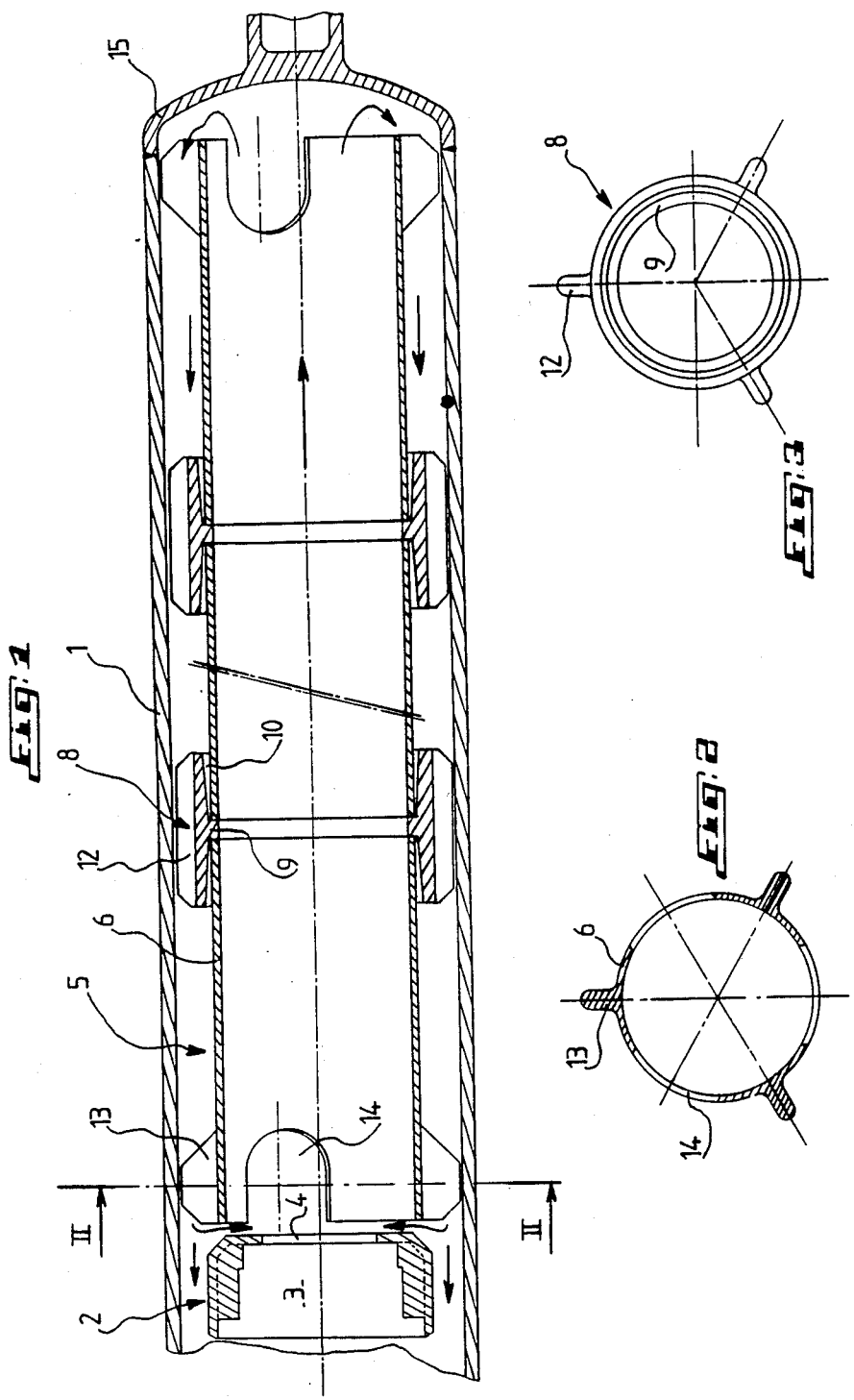

ent tube for recirculation purposes which comprises an outer tubular shell 1 made for instance from a refractory alloy. This tube also forms the outer casing of a burner device the outlet portion 2 of which is diagrammatically shown on the Figure. The reference numerals 3 and 4 designate the combustion chamber and the outelt, respectively, of the burnt gases adapted to flow within the inner tube bearing the reference numeral 5. The latter is made from thermomechanical ceramic and consists of a number of sections 6 axially aligned in registering relationship and connected to each other by pivotal connecting means, i.e. flexible or yielding connecting means. The tube sections 6 are arranged end to end. Each one of the connecting means is made as a for instance ceramic sleeve or bushing 8 coaxially surrounding the ends arranged in endwise relationship of both connected tube sections 6. The radially inner surface of the sleeve 8 advantageously carries in the middle of its length an annular collar 9 which projects radially inside and is fitting between both ends of the tube sections to be connected together. The inner diameter of the collar essentially corresponds to the inner diameter of the tube sections 6 whereas the outer diameter of the collar is a little greater than the outer diameter of the tube sections so as to leave some radial play or clearance therebetween taking into account the axial offset or staggering of the sections while providing for the fluid-tight sealing of the junction. Those inner surface portions 10 which are located on either side of the collar 9 have a diameter which gradually increases towards the ends of the sleeves. The increase in diameter is determined so as to allow a tube section 6 to follow through a suitable axial offset or staggering which may reach a few degrees the creep motion of the tubular shell 1. The latter may thus be made from a refractory allow, i.e. from a material with a coefficient of expansion and a behaviour at high temperatures very different from those of the material forming the inner tube 5.

INNER CERAMIC TUBE IN PARTICULAR FOR A GLOVE FINGER-SHAPED RADIANT TUBE FOR RECIRCULATION

The present invention relates to an inner ceramic tube in particular for a glove finger-shaped radiant tube for the recirculation of the burnt gases supplied by a burner and comprising a tubular shell coaxially surrounding said inner tube, the latter consisting of a plurality of axially aligned tube sections assembled through assembling means comprising an annular member coaxially surrounding the tube sections at the assembling area and carrying on its outer surface ribs for centering purposes inside of the tubular shell.

An inner ceramic tube of this kind is already known. The assembly of the tube sections is carried out by fitting the end of one section into the end of the other one. Moreover, a connecting ring of suitable shape is arranged in coaxial relationship about the junction area. This assembly involves a suitable shaping of the ends of the tube sections, in particular a reduction in the thickness of the tube end which engages the other one in interfitting relationship.

It is obvious that this decrease in the thickness of the walls of the tube sections causes the inner ceramic tube to be brittle and not very strong for withstanding mechanical stresses generated by bending deformations or deflections of the tubular shell and of the inner tube. Furthermore, the admissible axial offset or staggering of any two adjacent tube sections is relatively small.

The object of the present invention is to provide a radiant tube which does no longer exhibit the substantial inconveniences of the known tube which have just been referred to.

To achieve this goal, a ceramic tube according to the invention of the type referred to hereinabove is characterized in that the tube sections are arranged end to end and the assembling means consist of a sleeve coaxially surrounding the ends of the tube sections to be connected to each other and the radially inner surface of which advantageously comprises in the middle of its length an annular collar projecting radially inwards and fitting between both tube sections to be interconnected, the inner surface portions located on either side of the collar advantageously widening progressively towards the sleeve ends and in that said annular collar advantageously has substantially the same inner diameter as the tube sections whereas its outer diameter is slightly greater than the outer diameter of these tube sections so as to allow a suitable axial offset of the tube sections.

The invention will be better understood and further objects, characterizing features, details and advantages thereof will appear more clearly as the following explanatory description proceeds with reference to the accompanying diagrammatic drawings given by way of a non-limiting example only illustrating a presently preferred specific embodiment of the invention and wherein :

FIG. 1 is a view in axial section of a radiant tube comprising an inner tube according to the present invention;

FIG. 2 is a cross-section taken upon the line II—II of FIG. 1, and

FIG. 3 is an axial view of an assembling sleeve according to the present invention.

FIG. 1 shows an inner ceramic tube according to the invention incorporated into a glove finger-shaped radi- Each sleeve 8 comprises on its outer cylindrical surface ribs 12 for centering within the outer shell (FIG. 3). The first and the last sections 6 of the tube 5 compprise at their free ends centering ribs 13 and U-shaped cutouts or ears 14 formed in the cylindrical wall of the tube sections between any two centering ribs.

The inner tube 5 is open at both of its ends thereby allowing the circulation of the burnt gases issuing from the combustion chamber 3 into this tube and into the annular space provided between the inner tube 5 and the tubular shell 1 in the manner shown by arrows, the tubular shell being closed at its end remote from the burner by a closure element 15.

Owing to the provision of the ears 14, the radiant tube may even be used in a vertical position. As a matter of fact, the ears provide for a sufficient circulation of the combustion gas even though the last tube section is bearing upon or against the bottom of the shell subsequent to an axial displacement of this tube section or of several tube sections. For that purpose, the axial half-length of a sleeve is greater than the sum of the axial plays or clearances between the tube and the adjacent elements and the various tube sections.

Since the tube sections 6 have constant inner and outer diameters throughout their lengths, it is possible to adapt the tube 5 to any useful length by merely cutting the tube sections or one tube section to the desired length or by building up a tube from a number of standard modules of differing lengths.

What is claimed is :

1. An inner ceramic tube in particular for a radiant tube for recirculating burnt gases supplied by a burner and comprising a tubular shell coaxially surrounding said inner tube, the latter consisting of a plurality of axially aligned tube sections assembled through assembling means comprising an annular member coaxially surrounding the tube sections at the junction area, wherein the improvement consists in that said tube sections are arranged end to end and the assembling means consist each one of a sleeve coaxially surrounding the ends of the tube sections to be connected together and the radially inner surface of which advantageously comprises in the middle of its length an annular collar radially projecting inwards and fitting between both tube sections to be interconnected, the inner surface portions located on either side of said collar widening gradually towards the ends of said sleeve whereas said annular collar has substantially the same inner diameter as the tube sections and its outer diameter is slightly greater than the outer diameter of these tube sections so as to allow a suitable axial offset of the tube sections.

2. A tube according to claim 1, wherein said sleeve carries on its radially outer cylindrical surface ribs for centering inside said tubular shell.

3. A tube according to claim 1, further comprising at its ends means such as radial ribs for centering same inside of said tubular shell.

4. A tube according to claim 1, further comprising at its ends ears for promoting the gas circulation.

5. A tube according to claim 1, wherein the length of that portion of a sleeve which axially overlaps a tube section is greater than the sum of the axial plays between the tube and the adjacent elements and the various tube sections.

6. A tube according to claim 1, wherein one tube section has constant inner and outer diameters throughout its axial length.

* * * * *

UNITED STATES PATENT AND TRADEMARK OFFICE
CERTIFICATE OF CORRECTION

PATENT NO. : 4,850,334

DATED : 25 July 1989

INVENTOR(S) : Jean-Pierre CASSAGNE et al.

It is certified that error appears in the above-identified patent and that said Letters Patent is hereby corrected as shown below:

| Column | Line | | |
|--------|------|---|---|
| ABS.   | [73] | Change "Gas De France" to --Gaz De France--. |
| 2      | 6    | Change "outelt" to --outlet--. |
| 2      | 36   | Change "allow" to --alloy--. |
| 2      | 41   | Change "compprise" to --comprise--. |

Signed and Sealed this

Nineteenth Day of February, 1991

*Attest:*

HARRY F. MANBECK, JR.

*Attesting Officer* — *Commissioner of Patents and Trademarks*